US012664143B2

(12) United States Patent
Mitra et al.

(10) Patent No.: US 12,664,143 B2
(45) Date of Patent: Jun. 23, 2026

(54) IN-MEMORY HIERARCHICAL REPRESENTATION OF DATA VALUES

(71) Applicant: HEWLETT PACKARD ENTERPRISE DEVELOPMENT LP, Spring, TX (US)

(72) Inventors: Saptashwa Mitra, Spring, TX (US); Thomas Scott Ragland, Plano, TX (US); Vanessa Zambrano, Seattle, WA (US); Dipanwita Mallick, San Jose, CA (US); Charles Vollmer, Spring, TX (US); Lance Keith Kelley, Spring, TX (US); Nithin Singh Mohan, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/900,210

(22) Filed: Sep. 27, 2024

(65) Prior Publication Data
US 2026/0044482 A1 Feb. 12, 2026

Related U.S. Application Data

(60) Provisional application No. 63/679,694, filed on Aug. 6, 2024.

(51) Int. Cl.
*G06F 16/00* (2019.01)
*G06F 16/22* (2019.01)
(Continued)

(52) U.S. Cl.
CPC ...... *G06F 16/2246* (2019.01); *G06F 16/2228* (2019.01); *G06F 16/2445* (2019.01);
(Continued)

(58) Field of Classification Search
CPC ............. G06F 16/2246; G06F 16/2462; G06F 16/951; G06F 16/24522; G06F 16/2458;
(Continued)

(56) References Cited

U.S. PATENT DOCUMENTS 6,931,393 B1 * 8/2005 Schreiber ............ G06F 16/9027
709/219
7,707,214 B2 * 4/2010 Monro ................... H04N 19/97
375/E7.203
(Continued)

FOREIGN PATENT DOCUMENTS

EP 3200101 A1 * 8/2017
WO WO 2012/113756 A1 * 8/2012
(Continued)

OTHER PUBLICATIONS

Andrey A. Efanov et al., "Welford's algorithm for weighted statistics", 2021 3rd International Youth Conference on Radio Electronics, Electrical and Power Engineering (REEPE), Mar. 2021, pp. 1-5.*
(Continued)

*Primary Examiner* — Srirama Channavajjala
(74) *Attorney, Agent, or Firm* — Trop, Pruner & Hu, P.C.

(57) ABSTRACT

In some examples, a system receives data values related to a computing environment, and produces, in a memory, an in-memory representation of the data values comprising a hierarchical arrangement of bins, where a bin of the bins includes a statistical metric based on an aggregate of a subrange of the data values, and the bins at different hierarchical levels of the hierarchical arrangement of bins represent different resolutions at which the data values are aggregated. The system receives, a query requesting a computation, the query comprising a query filter. The system identifies a hierarchical level of the different hierarchical levels of the hierarchical arrangement of bins based on the (Continued)

query filter, and performs the computation using bins at the identified hierarchical level.

20 Claims, 4 Drawing Sheets

(51) Int. Cl.

| | |
|---|---|
| *G06F 16/242* | (2019.01) |
| *G06F 16/2452* | (2019.01) |
| *G06F 16/2453* | (2019.01) |
| *G06F 16/2457* | (2019.01) |
| *G06F 16/2458* | (2019.01) |

(52) U.S. Cl.
CPC .. *G06F 16/24522* (2019.01); *G06F 16/24545* (2019.01); *G06F 16/2457* (2019.01); *G06F 16/2462* (2019.01)

(58) Field of Classification Search
CPC ......... G06F 16/24545; G06F 16/24547; G06F 16/248; G06F 16/2445; G06F 16/26; G06F 16/2457; G06F 16/2228; G06F 16/2453; G06F 16/93
See application file for complete search history.

(56) References Cited

U.S. PATENT DOCUMENTS

| | | | | |
|---|---|---|---|---|
| 7,890,546 | B2 * | 2/2011 | Shah ................... | G06F 21/6227 |
| | | | | 715/700 |
| 8,038,074 | B2 * | 10/2011 | Monro .................... | H03M 7/40 |
| | | | | 235/494 |
| 8,170,984 | B2 * | 5/2012 | Bakalash .............. | G06F 16/283 |
| | | | | 707/603 |
| 10,725,616 | B1 * | 7/2020 | Porath ..................... | G06F 16/26 |
| 11,050,653 | B2 | 6/2021 | Wohlschlegel et al. | |
| 12,153,573 | B2 * | 11/2024 | Miao ................... | G06F 16/2453 |
| 2009/0006156 | A1 * | 1/2009 | Hunt ...................... | G06Q 30/02 |
| | | | | 705/7.11 |
| 2018/0300350 | A1 * | 10/2018 | Mainali ............... | G06F 16/9027 |
| 2019/0095478 | A1 * | 3/2019 | Tankersley .......... | G06F 11/3419 |
| 2021/0390423 | A1 * | 12/2021 | Latapie ............... | H04L 41/0631 |
| 2021/0406223 | A1 * | 12/2021 | Hughes ............... | G06F 16/1734 |
| 2022/0182379 | A1 * | 6/2022 | Budman ................. | G06F 3/011 |
| 2022/0207386 | A1 | 6/2022 | Todd et al. | |
| 2022/0335054 | A1 * | 10/2022 | Le ......................... | G06F 16/258 |
| 2023/0049969 | A1 * | 2/2023 | Bolikowski .......... | G06F 16/254 |
| 2023/0283536 | A1 | 9/2023 | Frost et al. | |
| 2023/0325383 | A1 * | 10/2023 | Kokenes ................ | G06F 9/451 |
| | | | | 707/722 |

FOREIGN PATENT DOCUMENTS

| | | | |
|---|---|---|---|
| WO | WO 2018085027 A1 * | 5/2018 | |
| WO | WO 2019104077 A1 * | 5/2019 | |

OTHER PUBLICATIONS

Batt et al., Learning Tableau: A data visualization tool, The Journal of Economic Education, 2020 (13 pages).

Battle et al., Dynamic Prefetching of Data Tiles for Interactive Visualization, 2016 (13 pages).
HEAVY.AI Documentation, What Will I Learn? downloaded Aug. 2, 2024 (18 pages).
Jain et al., Trend-Based Networking Driven by Big Data Telemetry for SDN and Traditional Networks, Mar. 2019 (15 pages).
Jakob Nielsen, Powers of 10: Time Scales in User Experience, Oct. 4, 2009 (14 pages.
Jha et al., Live Forensics for HPC Systems: A Case Study on Distributed Storage Systems, 2020 (16 pages).
Karau et al., Abstract Only, Scaling Python with Ray, 2022 (1 pages).
Li et al., Approximate Query Processing: What is New and Where to Go? Data Science and Engineering (2018) (19 pages).
Li et al., Science Direct, A replication strategy for a distributed high-speed caching system based on spatiotemporal access patterns of geospatial data, Jan. 2017 (9 pages).
Lins et al., "Nanocubes for Real-Time Exploration of Spatiotemporal Datasets", 2013, 10 pages.
Liu et al., imMens: Real-time Visual Querying of Big Data, Eurographics Conference on Visualization (EuroVis) 2013 (10 pages).
Mitra et al., STASH : Fast Hierarchical Aggregation Queries for Effective Visual Spatiotemporal Explorations, 2019 (11 pages).
Pahins et al., Hashed cubes: Simple, Low Memory, Real-Time Visual Exploration of Big Data, 2016 (10 pages).
Ray, Overview downloaded Sep. 7, 2024 (3 pages).
Roweth et al., HPE Slingshot Launched into Network Space (date unknown) (8 pages).
Shubham Borse, Apache Spark: The In-Memory Computing Powerhouse, Mar. 23, 2024 (8 pages).
Srinivasan et al., trellis—An Analytics Framework for Understanding Slingshot Performance, 2021 (8 pages).
Tao et al., Kyrix: Interactive Pan/Zoom Visualizations at Scale, Eurographics Conference on Visualization (EuroVis) 2019 (12 pages).
Timescale Documentation, What is Timescale Cloud? downloaded Aug. 2, 2024 (2 pages).
Weidner et al., Seastar: A Comprehensive Framework for Telemetry Data in HPC Environments, 2017 (8 pages).
Welford, B., Abstract Only, Note on a Method for Calculating Corrected Sums of Squares and Products, 1962 (4 pages).
Wikipedia, Flajolet-Martin algorithm downloaded Sep. 19, 2024 (3 pages).
Wolfram Mathworld, Skewness downloaded Sep. 8, 2024 (4 pages).
Zaharia et al., Resilient Distributed Datasets: A Fault-Tolerant Abstraction for In-Memory Cluster Computing, 2012 (14 pages).
Zaharia et al., Spark: Cluster Computing with Working Sets, 2010 (7 pages).
Cisco; "Cisco DNA Center AIOps An AI-driven Approach to Digital Transformation"; Dec. 5, 2022; 300 pages.
CloudFabrix; "CloudFabrix launches and demonstrates Data Fabric for Observability Platforms at Cisco Live 2023 Melbourne"; Dec. 6, 2023; 4 pages.
Reginiano, G.; "Fabric Real-Time Analytics Integrates with Newly Announced Database Watcher for Azure SQL"; Mar. 21, 2024; 9 pages.
Russinovich; M.; "Advancing safe deployment with AIOps—introducing Gandalf"; Jun. 30, 2021; 9 pages.

* cited by examiner

Year — 216

Month — 214

Day — 212

Group — 206

Switch — 204

Port — 202

230

228

226

224

222-4

222-3

222-2

222-1

220-1   220-2   220-3   220-4   220-5

Hierarchy
of bins
200

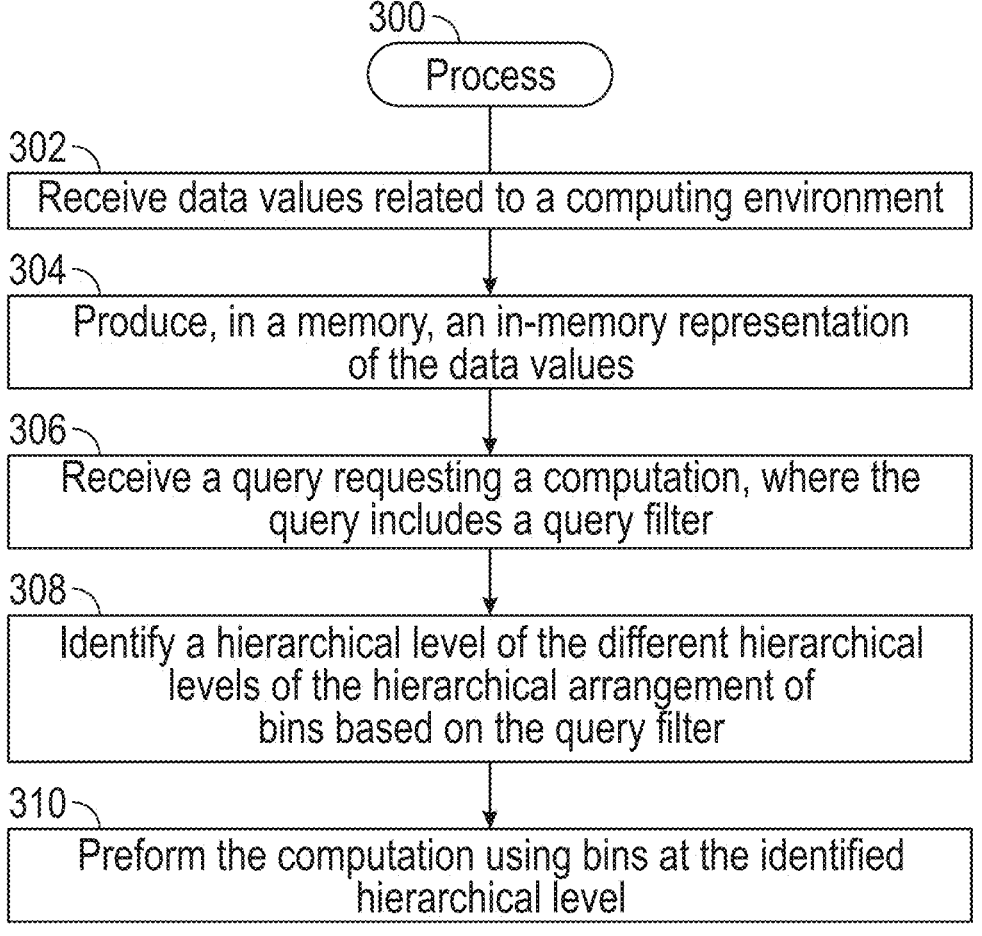

300 — Process

302 — Receive data values related to a computing environment

304 — Produce, in a memory, an in-memory representation of the data values

306 — Receive a query requesting a computation, where the query includes a query filter 308 — Identify a hierarchical level of the different hierarchical levels of the hierarchical arrangement of bins based on the query filter 310 — Preform the computation using bins at the identified hierarchical level

FIG. 3

IN-MEMORY HIERARCHICAL REPRESENTATION OF DATA VALUES

CROSS REFERENCE TO RELATED APPLICATION

This application claims the benefit under 35 U.S.C. § 119(e) of U.S. Provisional Patent Application No. 63/679,694, titled "In-Memory Hierarchical Representation of Data Values," filed Aug. 6, 2024, which is hereby incorporated by reference in its entirety.

BACKGROUND

A computing environment includes various different types of electronic devices. Examples of electronic devices include user devices, server computers, network devices, storage systems, and other types of electronic devices.

BRIEF DESCRIPTION OF THE DRAWINGS

Some implementations of the present disclosure are described with respect to the following figures.

FIG. 3 is a flow diagram of a process according to some examples.

Figure 1:
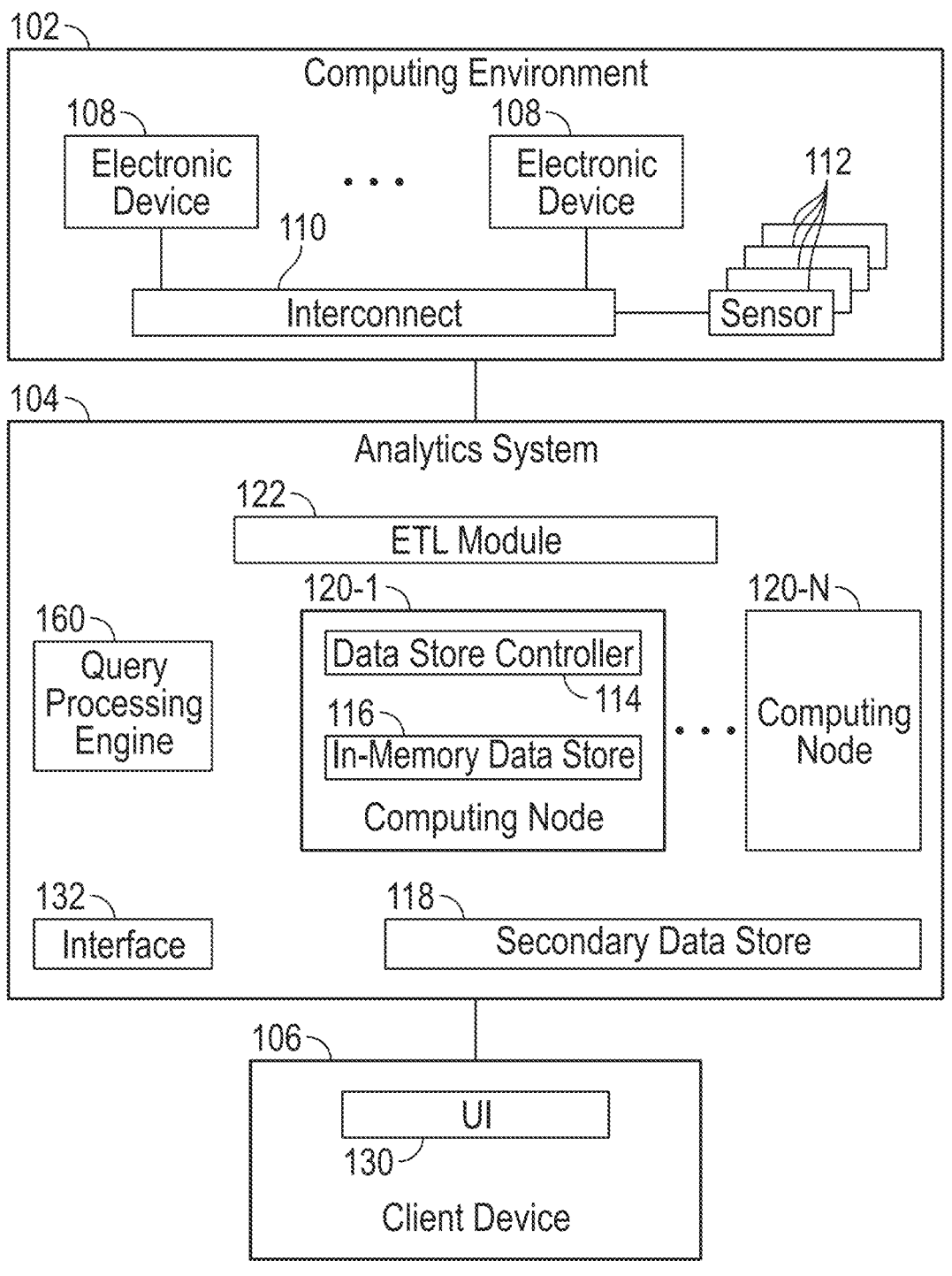
FIG. 1 is a block diagram of an arrangement including a computing environment, an analytics system that includes an in-memory data store, and a client device, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In-memory analytics can be performed on telemetry data collected in a computing environment. The in-memory analytics includes computations performed on telemetry data stored in a memory, rather than in a slower secondary storage such as a disk-based storage. In-memory computing enables faster data access and manipulation compared to disk-based storage. However, a challenge faced by in-memory analytics systems lies in scaling the memory capacity to accommodate large telemetry datasets that may be collected in a computing environment over long time intervals. Additionally, an in-memory analytics system may receive a relatively large number of queries from multiple requesters that can trigger different analytics computations. In the face of a large volume of telemetry data and multiple queries, the in-memory analytics system may experience significant latency in performing the requested computations.

In accordance with some implementations of the present disclosure, a system produces, in a memory, an in-memory representation of data values related to a computing environment, where the in-memory representation includes a hierarchical arrangement of bins each having a statistical metric based on an aggregate of a respective subrange of the data values. The bins at different hierarchical levels of the hierarchical arrangement of bins represent different resolutions at which the data values are aggregated. In response to a query requesting a computation, the system identifies a hierarchical level of the different hierarchical levels of the hierarchical arrangement of bins based on a query filter in the query. The system performs the requested computation using bins at the identified hierarchical level.

Techniques or mechanisms according to some examples of the present disclosure improve computer functionality and the relevant technology by enhancing memory efficiency in analytics systems that are to process large volumes of data related to a computing environment. The computing environment can include a relatively large system, such as an exascale system or another type of supercomputer, which includes relatively large quantities of electronic devices. Memory efficiency is achieved by maintaining a constant memory footprint for each bin. The constant memory footprint is achieved by storing a set of statistical metrics (or more simply, "statistics") for each bin that represents data values ingested by the analytics system. The quantity of statistics in the set of statistics of a bin does not change even as more data values associated with the bin are received.

The analytics of a large volume of data that is continually received by an analytics system during the operation of the computing environment can be performed in a timely and accurate manner. Accuracy can be achieved by aggregating data values in respective bins using statistics. The analytics system can ingest data for the computing environment in real time so that queries requesting computations on the ingested data can be handled in a timely manner. By maintaining data values at various different data aggregation resolutions corresponding to the different hierarchical levels of bins in an in-memory representation, the data analytics system can select bins at a particular hierarchical level on which a requested computation is to be applied. Different queries may request computations for different groups of data values, and the data analytics system can process such queries using bins at corresponding different hierarchical levels of the in-memory representation.

FIG. 1 is a block diagram of an example arrangement including a computing environment 102, an analytics system 104, and a client device 106. In further examples, there may be multiple computing environment, multiple analytics systems, or multiple client devices.

Examples of the computing environment 102 can include a high-performance computing (HPC) system, such as a supercomputer, an artificial intelligence (AI) system, or any other computing environment including a large number of electronic devices connected to a high-speed interconnect 110 (or multiple interconnects). An "interconnect" can refer to a network or any other type of communication medium. Examples of electronic devices 108 include any or some combination of the following: user devices, server computers, network devices, storage systems, control systems, or other types of electronic devices.

The computing environment 102 also includes sensors 112, which can include hardware sensors or software sensors (e.g., monitoring agents executed on processing resources). Some of the sensors 112 may be part of the electronic devices 108, while other sensors 112 are outside the electronic devices 108. The sensors 112 can collect telemetry data, which include metrics relating to any of the following characteristics of the computing environment 102: performance metrics, health metrics, usage metrics, or other types of metrics.

The analytics system 104 receives the telemetry data from the sensors 112 of the computing environment 102 and applies analytics on the telemetry data. Examples of analytics include monitoring the computing environment 102 to derive properties relating to the computing environment 102, debugging problems that have arisen in the computing environment 102, performing adaptive management of resources of the computing environment 102, or for other purposes. Examples of properties that may be derived include any or some combination of the following: network performance, workload performance, communication patterns, load conditions, error conditions, or other properties. Debugging a problem can include identifying a root cause of the problem, and identifying a remediation action to take in response to the problem. Adaptive management of resources can include allocating resources of the computing environment 102 in a dynamic manner to workloads that are executing in the computing environment 102. Examples of workloads include artificial intelligence (AI) workloads, image processing workloads, chatbot workloads, or other types of workloads.

In some examples, analytics can be performed on telemetry data using machine learning models. A machine learning model can be used to perform pattern detection, anomaly detection, and predictive analytics. The telemetry data may be aggregated and provided as input to the machine learning model. For example, the analytics system 104 can perform analytics associated with artificial intelligence for information technology operations (AIOps), which applies AI to IT operations. AIOps analytics can automate IT operations, intelligently identify patterns, adapt to changing loads, provide insights relating to IT operations, and resolve IT issues.

Due to large volumes of telemetry data from the computing environment 102 that may be collected over a long period of time, the amount of storage that is to be employed for storing the telemetry data can be quite large. Implementing a storage system with a sufficiently large storage capacity to hold a large amount of telemetry data can be expensive. Additionally, storing the telemetry data in relatively slow disk-based storage systems can lead to increased latencies in accessing and applying analytics on the telemetry data. Further, processing large amounts of telemetry data can lead to increased use of processing resources (resulting in increased resource costs) and may take a longer time to complete.

The analytics system 104 includes data stores to store data, including telemetry data received from the computing environment 102. The data stores include an in-memory data store 116 and a secondary data store 118. The in-memory data store 116 is implemented using one or more memory devices, such as dynamic random access memory (DRAM) devices, static random access memory (SRAM) devices, flash memory devices, or other types of memory devices.

In some examples, the in-memory data store 116 is included as part of a computing node 120-1. The computing node 120-1 further includes a data store controller 114 that manages the storage (during data ingestion) and retrieval of telemetry data in the in-memory data store 116. The data store controller 114 can be implemented using machine-readable instructions executed in the analytics system 104.

The secondary data store 118 can be implemented using one or more persistent storage devices such as disk-based storage devices or other types of storage devices. A memory device of the in-memory data store 116 has a lower input/output (I/O) access latency than a persistent storage device of the secondary data store 118. As a result, analytics performed by the analytics system 104 using data in the in-memory data store 116 is associated with reduced latency as compared to analytics performed using data in the slower secondary data store 118.

To allow the in-memory data store 116 to scale with ever-growing telemetry data, the telemetry data can be summarized (such as by the data store controller 114) and stored in summary form in the in-memory data store 116. The summarization of the telemetry data is continually updated as further telemetry data is received from the computing environment 102. As a result, even though the memory capacity of the in-memory data store 116 may be restricted, the dynamic summarization of telemetry data as telemetry data is received allows for the continually increasing amount of telemetry data to be represented by the in-memory data store 116 without enlarging the memory footprint used for the telemetry data.

The secondary data store 118 may store a copy of the summarized telemetry data stored in the in-memory data store 116. Alternatively or additionally, the secondary data store 118 may store raw telemetry data received from the computing environment 102. In other examples, the secondary data store 118 may be omitted.

As the in-memory data store 116 fills up, an eviction scheme can be applied by the data store controller 114 to remove in-memory telemetry data from the in-memory data store 116 to make space for other telemetry data. In this way, the in-memory data store 116 with a restricted memory capacity can accommodate continually received telemetry data.

In some examples the in-memory data store 116 is a distributed in-memory data store in which data is distributed across memory devices of the distributed in-memory data store across multiple computing nodes 120-1 to 120-N (N≥2). A "computing node" can refer to a physical computer. In other examples, the in-memory data store 116 is implemented in just one computing node, e.g., the computing node 120-1. In examples implementing the distributed in-memory data store, multiple instances of the data store controller 114 are present in the respective computing nodes 120-1 to 120-N to manage the access of respective in-memory data stores.

In some examples, the analytics system 104 includes an extract-transform-load (ETL) module 122 (which may be implemented with machine-readable instructions) to retrieve telemetry data from the computing environment 102. The ETL module 122 may apply transformations on the telemetry data, such as to convert raw telemetry data to a target format. The transformed data is then loaded by the ETL module 122 to the in-memory data store 116.

Queries can be received by the analytics system 104 from one or more client devices, including the client device 106. A query can request a specific analytics operation to be performed by the analytics system 104. The client device 106 includes a user interface (UI) 130, such as a graphical user interface (GUI) presented in a display device of the client device 106. A user of the client device 106 can submit queries to the analytics system 104 using the UI 130. The UI 130 also allows interactive analytical queries, in which the user can issue queries based on results presented to the user in the UI 130, to obtain further results from the analytics system 104.

The analytics system 104 includes a query processing engine 160 that produces result data based on a query received from a client device, such as the client device 106.

Result data produced by the query processing engine 160 can be presented in the UI 130 of the client device 106.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The client device 106 accesses the analytics system 104 through an interface 132. In some examples, the interface 132 includes an application programming interface (API), such as a Representational State Transfer (REST) API (also referred to as a RESTful API). The REST API supports the submission of web requests, which in some examples include queries submitted to the analytics system 104. In other examples, other types of interfaces (e.g., a Structured Query Language (SQL) interface, a Hypertext Transfer Protocol (HTTP) interface, or another type of interface) can be employed to allow client devices to interact with the analytics system 104.

Queries submitted from the client device 106 may seek result data that are aggregated at diverse scopes, e.g., over arbitrary temporal and telemetry bounds. A "temporal bound" can refer to a specific time range. A query seeking result data over a temporal bound causes analytics to be performed on telemetry data within the specific time range.

A "telemetry bound" can refer to a specific segment (also referred to as a "domain") of the computing environment 102, such as a segment made up of one or more ports identified by one or more port numbers, a segment made up of an individual switch in the interconnect 110, or a segment made up of a group of switches in the interconnect 110. A "switch" refers to a network device that forwards data based on network addresses (and possibly port numbers) in data packets. Although specific examples of telemetry bounds are listed above, in other examples telemetry bounds can refer to other segments of the computing environment 102.

Result data produced by the analytics system 104 according to scopes defined by queries can be visualized in the UI 130 of the client device 106. The result data may show information regarding utilization of resources for workloads, identify jobs associated with the workloads, or provide other information regarding the workloads. The UI 130 may include an interactive UI to allow the user of the client device 106 to drill down deeper into the result data or to request other insights based on the result data.

In some examples, the analytics system 104 supports a live mode of operation in which analytics is applied on telemetry over the most recent time interval, such as the most recent 10-minute interval or some other time interval. In other examples, the analytics can be based on any subset of past telemetry data (a historical mode of operation).

In some examples, the in-memory data store 116 is a Ray-based in-memory data store. Ray is an open-source unified framework for scaling AI and Python applications. In Ray, tasks and actors create and perform computations on data objects that are identified by object references. The data objects are stored in Ray's distributed shared-memory object store, and there is one object store per computing node in a cluster of computing nodes.

In other examples, the in-memory data store 116 can be implemented using other technologies (e.g., Apache Spark) that are able to store summarized telemetry data.

Hierarchical In-Memory Data Store

Figure 2:
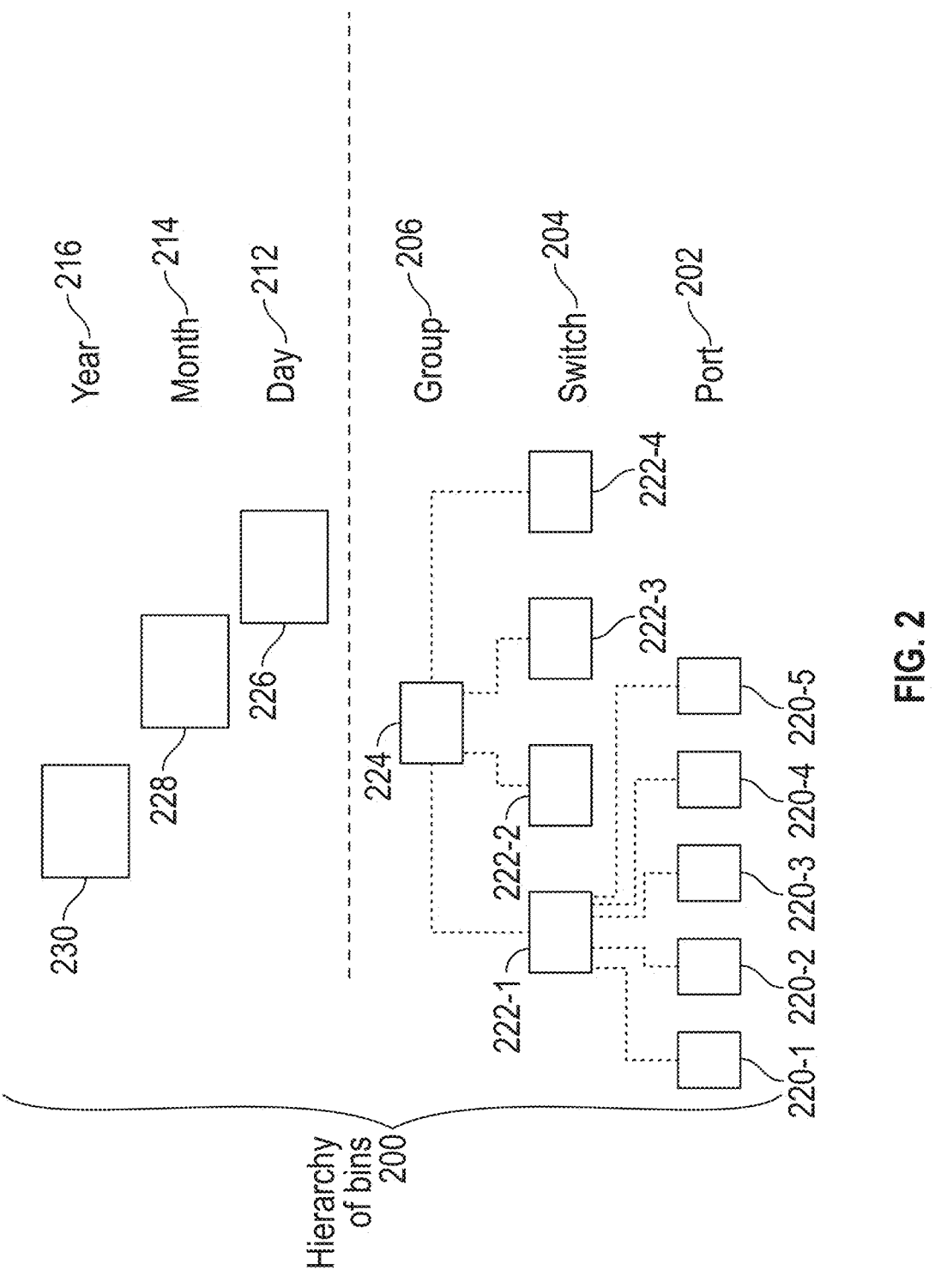
FIG. 2 is a block diagram of a hierarchy of bins that stores summarized representations of data values, according to some examples.

In some examples of the present disclosure, as shown in FIG. 2, the data model used by the in-memory data store 116 is a hierarchical data model that arranges data objects containing summarized telemetry data in a hierarchy of bins 200. The hierarchy of bins 200 includes multiple hierarchical levels, where a hierarchical level can include one or more bins.

A "bin" can refer to a unit of information that stores a summarized representation of a respective portion of telemetry data ("telemetry data portion"). The unit of information also includes bin metadata associated with the summarized representation of the telemetry data portion. Bins at different hierarchical levels of the hierarchy of bins 200 represent different resolutions at which telemetry data values are aggregated. A bin serves as the unit of data aggregation and analysis performed by the analytics system 104.

In the example of FIG. 2, the example hierarchical levels include a port level 202, a switch level 204, a group level 206, a day level 212, a month level 214, and a year level 216. The hierarchical levels 202, 204, and 206 divide data into telemetry bounds (ports, individual switches, and groups of switches). The hierarchical levels 212, 214, and 216 divide data into temporal bounds (days, months, and years). The bins of the hierarchy of bins 200 are logically organized as a multi-relational property graph with each hierarchical level grouping bins of a given telemetry or temporal resolution.

In other examples, a hierarchy of bins containing summarized representations of telemetry data can have a different organization or can have other hierarchical levels.

In the example of FIG. 2, the hierarchical levels are arranged in descending order of resolution (a hierarchical level, e.g., the port level 202, that represents data at a higher granularity is lower in the hierarchy than a hierarchical level, e.g., the group level 206, that represents data at a lower granularity). In other examples, the hierarchical levels are arranged in ascending order of resolution. Data at a higher granularity refers to higher resolution data, while data at a lower granularity refers to lower resolution data.

The port level 202 includes port bins 220-1 to 220-5, where each port bin 220 stores a summarized representation of telemetry data for a respective port. The port bins 220-1 to 220-5 store summarized representations of telemetry data for respective ports of a first switch represented by a switch bin 222-1. The switch bin 222-1 is part of the switch level 204, and the switch bin 222-1 contains a summarized representation of telemetry data for a first switch. The switch level 204 further includes switch bins 222-2 to 222-4 containing summarized representations of telemetry data for other switches. Although not shown, other port bins at the port level 202 contain summarized telemetry data for ports of the other switches.

The group level 206 includes a group bin 224, which contains a summarized representation of telemetry data for a group of switches (including the switches represented by the switch bins 222-1 to 222-4). Although just one group bin is shown in FIG. 2, in other examples, there may be multiple group bins representing other groups of switches.

Similarly, the day level 212 includes various day bins, including a day bin 226 containing a summarized representation of telemetry data for a particular day. The month level 214 includes various month bins, including a month bin 228 containing a summarized representation of telemetry data for a particular month. The year level 216 includes various year bins, including a year bin 230 containing a summarized representation of telemetry data for a particular year.

This mapping between granularities of telemetry data represented by the bins of the hierarchy of bins 200 and respective hierarchical levels allows the query processing engine 160 to quickly identify a set of bins that is to be used to satisfy a query, based on a filter in the query. For example, if the filter in the query seeks a result based on telemetry data for a given switch or time of day, the query processing engine 160 can traverse the hierarchy of bins 200 to find which bins contain the telemetry data satisfying the query filter.

The hierarchy of bins 200 is constructed using bin metadata. Examples of bin metadata include the following: a time range defining a time interval (e.g., day, month, year), a group identifier (ID) that identifies a group of switches, a switch ID that identifies a switch, and a port number that identifies a port.

In some examples, a representation of the hierarchy of bins 200 can include a set of key-value data structures. Each key-value data structure forms a bin of the hierarchy of bins 200.

The value of the key-value data structure is a summarized representation of a telemetry data portion, and the key of the key-value data structure includes bin metadata containing portion information that specifies what portion (time range or segment of the computing environment 102) the value corresponds to. The bin metadata of a given bin also indicates a neighborhood of the given bin. The neighborhood of the given bin includes parent bin(s) and child bin(s) that are above and below, respectively, the given bin in the hierarchy of bins 200.

As an example, the portion information of the bin metadata of the port bin 220-3 includes a tuple {G4, S2, P99}, where G4 is a group ID that identifies a group of switches, S2 is a switch ID, and P99 is a port number of a port. Using the foregoing tuple, the data store controller 114 can readily determine that the parent bin of the port bin 220-3 is the switch bin (e.g., 222-2) having the following bin metadata: {G4, S2}. In a further example, a tuple for the port bin can also include time information, e.g., {2023-12-23, G4, S2, P99}, where 2023-12-23 specifies a specific day. More generally, the tuple forming the portion information of the bin metadata of a bin can include {time range, group ID, switch ID, port range}, where the port range can identify one or more ports. Some of the elements of the tuple may be omitted in some bins. For example, the tuple for a switch bin excludes the port range, while the tuple for a group bin excludes the switch ID and port range.

To identify a child bin, the analytics system 104 can perform prefix matching of child bin metadata and parent bin metadata. For example, if a switch has switch bin metadata {G4, S2}, then bins with the following child bin metadata are children of the switch: {G4, S2, P70}, {G4, S2, P71}, and {G4, S2, P72}.

By using the set of key-value data structures to represent the hierarchy of bins 200, explicit links between bins do not have to be maintained in the set of key-value data structures, which can reduce the overall size of the in-memory data store 116. Not having to represent the links in the representation of the hierarchy of bins 200 can save a substantial amount of memory space if the bins are used to represent a large computing environment with many components. In addition to saving memory space, use of the set of key-value data structures allows the data store controller 114 to avoid having to traverse a tree of bins, which can be a costly operation in terms of processing resource usage.

In other examples, the hierarchy of bins 200 can be represented using a tree structure including nodes representing the bins and links between the nodes that define the relationships between the bins.

In some examples, due to the easy inference of hierarchical relationships of bins using a set of key-value data structures, the data store controller 114 allows for conditional persistence of lower resolution (higher granularity) bins in the in-memory data store 116. The lowest level bins (leaf-level bins) (which represent ports in the example hierarchy of bins 200) are persisted as respective summarized telemetry data for the lowest level bins are produced by the data store controller 114. "Persisting" a bin refers to storing the bin in the in-memory data store 116. None of the higher-level (non-leaf) bins have to be stored in the in-memory data store 116 during the ingestion of telemetry data by the analytics system 104. Maintaining higher resolution bins allows for the dynamic computation of lower resolution bins on the fly during query evaluations since lower level (higher resolution) bins can be quickly merged to construct higher level (lower resolution) bins.

Data Summarization in Bins

Incoming telemetry data is aggregated by the data store controller 114 to produce aggregated telemetry data that makes up summarized representations of telemetry data portions. For example, based on metadata of the incoming telemetry data, the data store controller 114 identifies a telemetry data portion TD_S2 (including telemetry data points) for switch S2 and aggregates the telemetry data points of the telemetry data portion TD_S2 to produce aggregated telemetry data (including a single set of values such as a key-value data structure) to be stored as a summarized representation of the telemetry data portion TD_S2 in the switch bin 222-2 for switch S2.

Storing aggregated telemetry data in the bins reduces redundancy and storage requirements by keeping the data size for each subregion constant, irrespective of the volume of the incoming telemetry data. This approach is useful for handling large incoming telemetry data streams from the computing environment 102, since the large incoming telemetry data streams may quickly overwhelm storage systems and slow down analytics without the summarization applied according to some examples of the present disclosure. By pre-aggregating telemetry data, more cost-efficient data storage and faster query processing in real-time can be achieved.

In some examples, the aggregation of telemetry data points uses Welford's online algorithm, such as according to the pseudocode in Table 1 below.

TABLE 1

Welford's Online Algorithm

```
Initialize:
m1 ← 0 (mean)
m2 ← 0 (variance)
m3 ← 0 (skewness)
m4 ← 0 (kurtosis)
n ← 0 (quantity of samples observed)
Update:
for each new data point x do
    n ← n + 1
    δ ← x – m1
    m1 ← m1 + δ/n
    m2 ← m2 + δ * (x – m1)
    δ2 ← δ * δ
    m3 ← m3 + δ2 * (x – m1) – 3 * m2 * δ/n
    δ3 ← δ2 * δ
    m4 ← m4 + δ3 * (x – m1) – 6 * m2 * δ2/n + 4 * m3 * δ/n²
```

In Table 1, m1 represents a mean of data points, m2 represents a variance of data points, m3 represents a skewness of data points (a measure of asymmetry of a distribution of data points), m4 represents a kurtosis of data points (a measure of the tailedness of a distribution of data points, where tailedness refers to how often data outliers occur), and n represents a quantity of data points that have been received.

The variables m1, m2, m3, m4, and n are statistics provided by Welford's online algorithm to represent incoming data. The set of values included in a bin of the hierarchy of bins 200 includes a set of the foregoing statistics. Although the example illustrates the use of specific statistics, in other examples, a different number of statistics or different types of statistics may be employed.

The "initialize" section of the pseudocode of Table 1 initializes each of m1, m2, m3, m4, and n to zero. For each new data point x received, the pseudocode of Table 1 aggregates the data point x in the "update" section of the pseudocode of Table 1. The updated set of statistics m1, m2, m3, m4, and n replaces the previous set of statistics m1, m2, m3, m4, and n stored in the respective bin.

Note that the update of the statistics avoids a re-computation of the statistics from scratch (i.e., from the underlying data points), leading to significantly faster updates. As a result, the updates of bins in the hierarchy of bins 200 can be performed in an online (real-time) manner as incoming data points are received. Further, note that even though a new data point x is received, the quantity of statistics (m1, m2, m3, m4, and n) stored in the bin remains the same, which provides a constant memory footprint in the in-memory data store 116. A "constant" memory footprint refers to maintaining the same allocation of memory to storing a set of values. Thus, even if a massive number of new telemetry data points are received by the analytics system 104, each bin of the hierarchy of bins 200 maintains a constant memory footprint. Each bin represents aggregated telemetry data for any configurable telemetry bound or temporal bound of incoming telemetry data.

Because of the efficient usage of the memory storage capacity of the in-memory data store 116, the in-memory data store 116 can store representations of telemetry data over larger time frames (e.g., over several days rather than several minutes). As a result, analytics can be performed over longer time frames, which may be useful for understanding how the computing environment 102 is behaving over such longer time frames.

In some cases, as telemetry data is received, the analytics system 104 can identify that new bins are to be added to the hierarchy of bins 200, such as for new switches or in response to a modification of the computing environment 102. If the in-memory data store 116 is full or close to being full, some bins may be evicted.

In an example, telemetry data from the computing environment 102 includes the following parameters: rxBW (receive bandwidth), txBW (transmit bandwidth), rxCongestion (receive congestion), and txCongestion (transmit congestion). In other examples, alternative or additional parameters can be included in telemetry data. For each of the parameters, a set of statistics is provided by Welford's online algorithm is stored in a bin. If there are four parameters, then four sets of statistics are contained in a bin.

In some examples, even though memory footprints of bins remain constant even as more telemetry data points are received, the statistics stored in each bin (such as statistics provided by the Welford's online algorithm) provide an accurate representation of the telemetry data portion represented by the statistics. Thus, any query result data produced using the statistics provides accurate insights.

In examples where the in-memory data store 116 is distributed across multiple computing nodes 120-1 to 120-N, the in-memory data store 116 is partitioned across multiple in-memory data store partitions, with each computing node including a respective in-memory data store partition. In some examples, the partitioning of the in-memory data store 116 can be according to groups of components, such as groups of switches. For example, a first in-memory data store partition is for a first group of switches (or a first collection of groups of switches), and a second in-memory data store partition is for a second group of switches (or a second collection of groups of switches).

In case of a cold start of the analytics system 104 (when the analytics system 104 starts in a state in which the hierarchy of bins 200 is not populated), the analytics system 104 can initially construct the hierarchy of bins 200 in the in-memory data store 116 using prior data, such as from the secondary data store 118. The hierarchy of bins 200 can then be updated as new telemetry data is received, and eviction can be applied to remove data from the hierarchy of bins 200 (eviction is discussed further below).

In other examples, other types of statistic calculation algorithms can be employed to generate statistical metrics to represent telemetry data, such as any or some combination of the following: a sliding window algorithm that computes mean and standard deviation values, a Flajolet-Martin Sketch algorithm that estimates the cardinality (number of distinct elements) in data, or any other algorithm that computes statistical metrics.

Memory-Efficient Online Aggregates

The analytics system 104 can decide whether or not to store higher-level bins in the in-memory data store 116 during the ingestion of telemetry data by the analytics system 104. This decision can be based on the memory capacity of the in-memory data store 116. Skipping the storing of some higher-level bins can reduce memory consumption during telemetry data ingestion. The higher-level bins (lower resolution bins) can be lazily computed at a later time, such as during query evaluation, from lower-level bins (higher resolution bins) by merging the lower-level bins.

In examples where the Welford's online algorithm is used to perform aggregates, the merging of bins also uses the Welford's online algorithm. The merging of a first bin and a second bin would simply update the statistics of one of the first or second bin using the statistics of the other one of the first or second bin using the Welford's online algorithm.

Merging of bins may also be performed in a distributed setting in which bins in in-memory data store partitions of different computing nodes have overlapping bounds. In such cases, statistics from bins in the different computing nodes are merged during query evaluation.

Data Purging

As noted above, as the in-memory data store 116 fills up (overflows), an eviction scheme can be applied by the data store controller 114 to remove in-memory telemetry data from the in-memory data store 116 to make space for other telemetry data. The eviction of bins from the in-memory data store 116 can be performed in parallel with other operations of the analytics system 104, including ingesting telemetry data from the computing environment 102 and performing query evaluation. In some examples, the data store controller 114 can execute eviction of bins intermittently at configurable intervals.

In some examples, to facilitate real-time analytics over the most recent telemetry data, the analytics system 104 prioritizes maintaining the most recent bins in response to a memory overflow. For example, the data store controller 114 can set a specified bin quantity threshold to the total number of bins that can be maintained in the in-memory data store 116. In this example, when the total number of bins in the in-memory data store 116 reaches the specified bin quantity threshold, the data store controller 114 can start removing bins to make space for new bins as further telemetry data is received from the computing environment 102.

In another example, the data store controller 114 can set a specified time threshold, in which any bin associated with a timestamp (part of the bin metadata) that is earlier than the current timestamp (representing a current time) by the specified time threshold is a candidate for eviction. In either case, as part of the eviction scheme, the in-memory data store 116 removes older bins to make space for newer bins containing the latest information, which in some examples provides a sliding temporal window of in-memory bins. This targeted eviction approach allows the analytics system 104 to maintain a fresh and up-to-date in-memory representation of the telemetry data.

In some examples, if a bin selected for eviction is a parent bin that has one or more child bins, the data store controller 114 can remove the child bin(s) of the parent bin. For example, the parent bin selected for eviction may have the following bin metadata: {G4, S2} (e.g., the parent bin is for switch S2 and the switch is part of group G4). The data store controller 114 can easily identify its child bins as those sharing a prefix (e.g., G4, S2 in the above example). Thus, the child bins with the following bin metadata would be candidates for eviction: {G4, S2, P70}, {G4, S2, P71}, and {G4, S2, P72}. In other words, any child bins associated with bin metadata that matches a prefix of the bin metadata for the parent bin for switch S2 in the above example can be selected for eviction.

Data Ingestion and Population

As telemetry data is ingested by the analytics system 104, the bins of the in-memory data store 116 are updated by the data store controller 114. As noted above, in some cases, leaf-level bins are updated in response to newly ingested data, but non-leaf bins may be updated lazily at a later time, such as during query evaluation. In such cases, non-leaf bins associated with leaf bins that have been updated are considered to be stale.

In some examples, bin state information (e.g., in the form of a hierarchical bitmap) can be maintained to identify which non-leaf bins are stale. For example, the bin state information can include staleness indicators (e.g., bits). A staleness indicator if set to a first value (e.g., "1") indicates that a respective bin is stale, but if set to a second value (e.g., "0") indicates that the respective bin is not stale. Bins marked as stale by the bin state information are updated during query evaluation.

In further examples where the full hierarchy of bins is updated during data ingestion, the bin state information can be omitted from the analytics system 104.

In examples where the analytics system 104 includes the multiple computing nodes 120-1 to 120-N, the data store controller 114 in each respective computing node can independently handle ingested data by updating the corresponding hierarchy of bins in the respective computing node.

Query Evaluation

An example query that may be processed by the query processing engine 160 of the analytics system 104 is set forth in Table 2 below.

TABLE 2

| 1 | SELECT AVG(rxCongestion) |
|---|---|
| 2 | FROM Table_Telemetry |
| 3 | WHERE GROUP = G3 AND |
| 4 | SWITCH IN {Switch_List} and |
| 5 | PORT IN {Port_Range} and |
| 6 | TIME IN {Query_Time} |
| 7 | GROUP BY GROUP/SWITCH/PORT, DAY/MONTH/YEAR |

The foregoing query is an example SQL query. Line 1 of the query specifies that an output to be produced is the computation of the average of the rxCongestion parameter. The average of a parameter is an example of an aggregation performed on the parameter. Line 2 of the query specifies that the query evaluation is based on a table named Table_Telemetry, which is the name of the table containing the hierarchy of bins 200 (FIG. 2).

Lines 3-6 of the query form the predicate (filter) of the query. The predicate (WHERE clause) specifies that the computation is based on telemetry data for group G3, for switch(es) of group G3 identified in Switch_List, for port(s) of the identified switch(es) in Port_Range, and for a time range identified in Query_Time.

The GROUP BY clause in line 7 of the query can specify how a result produced by the aggregation in the SELECT clause (e.g., AVG(rxCongestion)) is to be grouped. For example, the GROUP BY clause can specify a grouping based on any of the following: group of switches, an individual switch, or an individual port. For example, if grouping is based on an individual switch, then AVG(rxCongestion) produces result data grouped by switches in Switch_List. As an example, if Switch_List identifies switches S3 and S4, then AVG(rxCongestion) produces first result data including the average of rxCongestion for switch S3, and second result data including the average of rxCongestion for switch S4. The first and second result data are provided to the UI 130 in the client device 106.

As another example, the GROUP BY clause can specify a grouping based on time, such as day, month, or year.

Effectively, the GROUP BY clause selects which hierarchical level of the hierarchy of bins 200 is used for performing the aggregation specified by the SELECT clause. If the GROUP BY clause specifies a grouping based on GROUP, then the query processing engine 160 retrieves statistics from bin(s) at the group level 206 in performing the aggregation. As another example, if the GROUP BY clause specifies a grouping based on PORT, then the query processing engine 160 retrieves statistics from bin(s) at the port level 202 in performing the aggregation. As a further example, if the GROUP BY clause specifies a grouping based on MONTH, then the query processing engine 160 retrieves statistics from bin(s) at the month level 214 in performing the aggregation.

To compute an average of a parameter, the mean statistic (e.g., m1 in Table 1) in respective bins can be used. In other examples, other queries can call for other computations that can be satisfied using other statistics in the bins, including m2, m3, m4, or other statistics.

In examples where the in-memory data store 116 is distributed across the multiple computing nodes 120-1 to 120-N, result data produced by the query processing engines 160 in the multiple computing nodes 120-1 to 120-N are combined (such as by one of the computing nodes) and the combined result data is presented to the UI 130 of the client device 106.

By using efficient representations of large amounts recent telemetry data in the in-memory data store 116, the analytics system 104 is able to perform faster evaluations due to the lower latency associated with accessing the in-memory data store 116, and the reduced amount of data (in the form of statistics) that have to be retrieved from bins of the in-memory data store 116. A user can specify a diverse range of temporal or telemetry resolutions in queries submitted to the analytics system 104.

The analytics system 104 supports high-throughput and real-time ingestion of telemetry data, which may be generated at high velocity from a large computing environment, such as an HPC environment. By storing summarized representations of telemetry data, ingestion of large amounts of telemetry data can be accomplished without significantly increasing the memory footprint of the in-memory data store 116. In fact, the memory footprint of any given bin of the in-memory data store 116 remains constant as statistics of the given bin are updated in response to newly received telemetry data. The efficient storage of summarized representations of telemetry data enhances scalability of the analytics system 104 to support increasing data volumes in large computing environments.

In some examples, statistics in the bins produced by the Welford's online algorithm provide accurate summarized representations of telemetry data, so that result data produced from the statistics are also accurate.

FURTHER EXAMPLES

FIG. 3 is a flow diagram of a process 300 according to some examples of the present disclosure. The process 300 may be performed by a system, such as the analytics system 104 of FIG. 1, for example. Although FIG. 3 shows a sequence of tasks, in other examples, the tasks may be performed in a different order, some of the tasks may be omitted, and other tasks may be added.

The process 300 includes receiving (at 302) data values related to a computing environment (e.g., 102 in FIG. 1). In some examples, the data values include telemetry data points collected by sensors of the computing environment. In other examples, the data values can include other data values produced by or for the computing environment.

The process 300 includes producing (at 304), in a memory, an in-memory representation of the data values. The in-memory representation includes a hierarchical arrangement of bins, such as the hierarchy of bins 200 depicted in FIG. 2. A "hierarchical arrangement" of bins refers to bins at different levels in which a bin at one level has a relationship with a bin at another level. A bin contains a statistical metric based on an aggregate of a subrange of the data values. The bins at different hierarchical levels of the hierarchical arrangement of bins represent different resolutions at which the data values are aggregated. A relationship between bins can be a parent relationship or a child relationship. A child bin of a given bin represents data at a higher resolution than the given bin. A parent bin of the given bin represents data at a lower resolution than the given bin.

The "subrange" of the data values aggregated to produce the statistical metric for a bin refers to data values of a segment (or domain) of the computing environment, or data values of a temporal range.

The process 300 includes receiving (at 306) a query requesting a computation, where the query includes a query filter. A "query filter" refers to one or more conditions specified in the query regarding what data is of interest for performing a computation specified by the query.

The process 300 includes identifying (at 308) a hierarchical level of the different hierarchical levels of the hierarchical arrangement of bins based on the query filter. "Identifying" the hierarchical level includes determining which hierarchical level corresponds to a grouping (e.g., in a GROUP BY clause) specified by the query.

The process 300 includes performing (at 308) the computation using bins at the identified hierarchical level. The "computation" can refer to any operation requested by the query. The computation uses statistical measures in the bins at the identified hierarchical level to produce result data for the query.

In some examples, the system assigns a subset of the data values to a first bin of the hierarchical arrangement of bins based on metadata associated with the data values. The metadata can specify time information for the data values, and segments of the computing environment that the data values are associated with. The system computes a first statistical metric based on data values of the subset of the data values, and adds the first statistical metric to the first bin.

In some examples, the system receives a new data value for the first bin, and the system updates the first statistical metric using a statistic calculation algorithm (e.g., Welford's online algorithm) that updates a current value of the first statistical metric based on combining the current value of the first statistical metric with an update value derived from the new data value. For example, in Table 1, to update m1 (which is an example of a statistical metric), the system computes m1←m1+δ/n, which updates the current value of m1 with an update value δ/n. As another example, to update m3 (which is another example of a statistical metric), the system computes m3←m3+δ2*(x−m1)−3*m2*δ/n, which updates the current value of m3 with an update value δ2*(x−m1)−3*m2*/n.

In some examples, the system computes a second statistical metric based on the data values of the subset of the data values, and adds the second statistical metric to the first bin. The first bin includes a set of statistical metrics including the first statistical metric and the second statistical metric.

In some examples, the different hierarchical levels of the hierarchical arrangement of bins include hierarchical levels that correspond to different segments of the computing environment.

In some examples, the different hierarchical levels of the hierarchical arrangement of bins include hierarchical levels that correspond to different temporal ranges.

In some examples, a first bin of the bins includes bin metadata specifying a hierarchical level that the first bin is part of and indicating one or more neighbor bins of the first bin. The neighbor bins can include a parent bin of the first bin or a child bin of the first bin, or both parent and child bins of the first bin.

In some examples, the system identifies a neighbor bin of the first bin using the bin metadata.

In some examples, the neighbor bin is at a hierarchical level that is higher than a hierarchical level of the first bin. As part of the computation in response to the query, a statistical metric is computed for the neighbor bin.

In some examples, the statistical metric for the neighbor bin is not computed during ingesting of the data values in the system.

In some examples, the system includes a plurality of computing nodes, such as the computing nodes 120-1 to 120-N of FIG. 1. The in-memory representation of the data values is a first in-memory representation of a first subset of the data values. The memory containing the first in-memory representation of the data values is in a first computing node of the plurality of computing nodes. The system produces, in a second memory of a second computing node of the plurality of computing nodes, a second in-memory representation of a second subset of the data values including a hierarchical arrangement of bins. The computation performed in response to the query further uses bins at a hierarchical level of the second in-memory representation.

In some examples, the system maintains a data structure (e.g., a bitmap) including indicators of which bins of the in-memory representation are stale. A given bin is stale if a statistical metric in a child bin of the given bin has been updated and a statistical metric in the given bin has not yet been updated.

In some examples, the system evicts a selected bin from the memory based on a timestamp of the bin. Based on the evicting of the selected bin, the system further evicts child bins of the selected bin.

Figure 4:
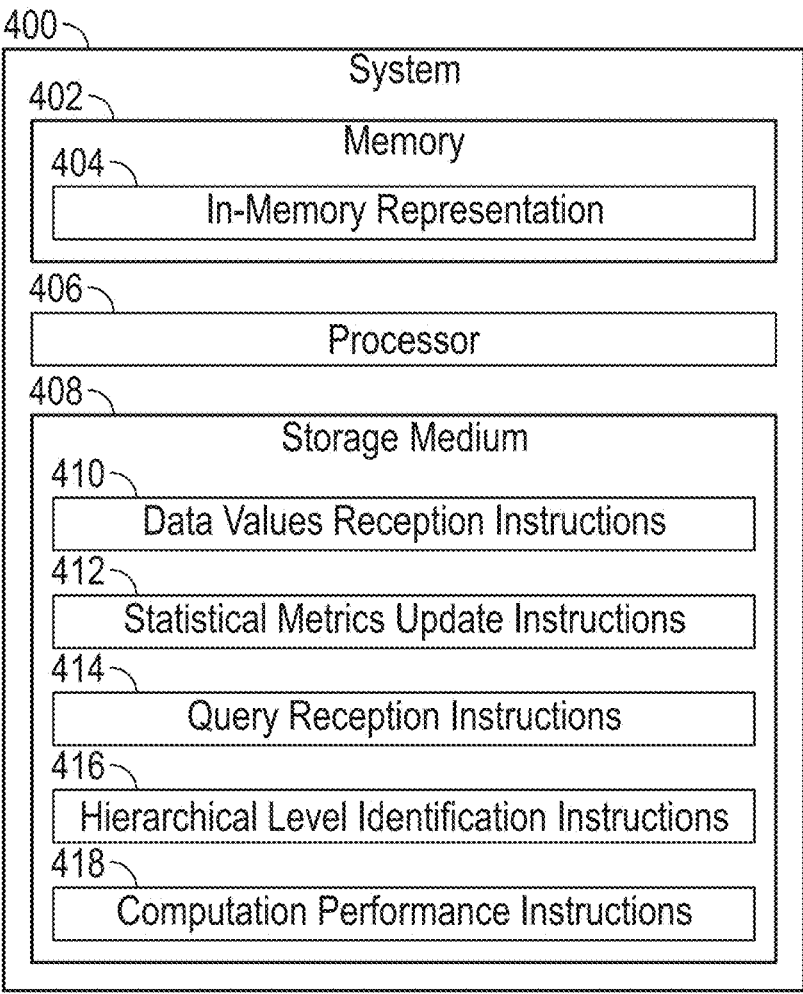
FIG. 4 is a block diagram of a system according to some examples.

FIG. 4 is a block diagram of a system 400 according to some examples of the present disclosure. An example of the system 400 is the analytical system 104 of FIG. 1. The system 400 can be implemented with one or more computers.

The system 400 includes a memory 402 to store an in-memory representation 404 of data values. The in-memory representation 404 includes a hierarchical arrangement of bins, such as the hierarchy of bins 200 in FIG. 2.

The system 400 further includes a hardware processor 406 (or multiple hardware processors). A hardware processor can include a microprocessor, a core of a multi-core microprocessor, a microcontroller, a programmable integrated circuit, a programmable gate array, or another hardware processing circuit.

The system 400 further includes a storage medium 408 storing machine-readable instructions executable on the hardware processor 406 to perform various tasks. Machine-readable instructions executable on a hardware processor can refer to the instructions executable on a single hardware processor or the instructions executable on multiple hardware processors.

The machine-readable instructions in the storage medium 408 include data values reception instructions 410 to receive data values from a computing environment. "Receiving" the data values can refer to receiving raw data values from the computing environment, or receiving processed data values (e.g., as performed by the ETL module 122 of FIG. 1).

The machine-readable instructions in the storage medium 408 include statistical metrics update instructions 412 to, responsive to the received data values, update statistical metrics in a collection of the bins of the hierarchical arrangement of bins. A "collection" of bins can include a single bin or multiple bins. Updating a statistical metric can refer to computing a new value of the statistical metric that aggregates a current value of the statistical metric with an update value based on a newly received data value.

The machine-readable instructions in the storage medium 408 include query reception instructions 414 to receive a query requesting a computation, the query including a query filter. The query may be submitted from a user at a client device (e.g., 106 in FIG. 1), for example.

The machine-readable instructions in the storage medium 408 include hierarchical level identification instructions 416 to identify a hierarchical level of the different hierarchical levels of the hierarchical arrangement of bins based on the query filter.

The machine-readable instructions in the storage medium 408 include computation performance instructions 418 to perform the computation using bins at the identified hierarchical level.

In some examples, the collection of bins in which the statistical metrics are updated include leaf bins of the hierarchical arrangement of bins. A "leaf" bin refers to a bin representing a highest resolution of data values. The machine-readable instructions can defer updating a statistical metric of a parent bin of the leaf bins.

In some examples, the machine-readable instructions can update the statistical metric of the parent bin during evaluation of the query.

In some examples, the updating of the statistical metrics includes updating a first statistical metric in a first bin of the collection of bins using a statistic calculation algorithm that updates a current value of the first statistical metric based on combining the current value of the first statistical metric with an update value derived from a received data value. A memory footprint of the first bin remains constant after the updating.

Figure 5:
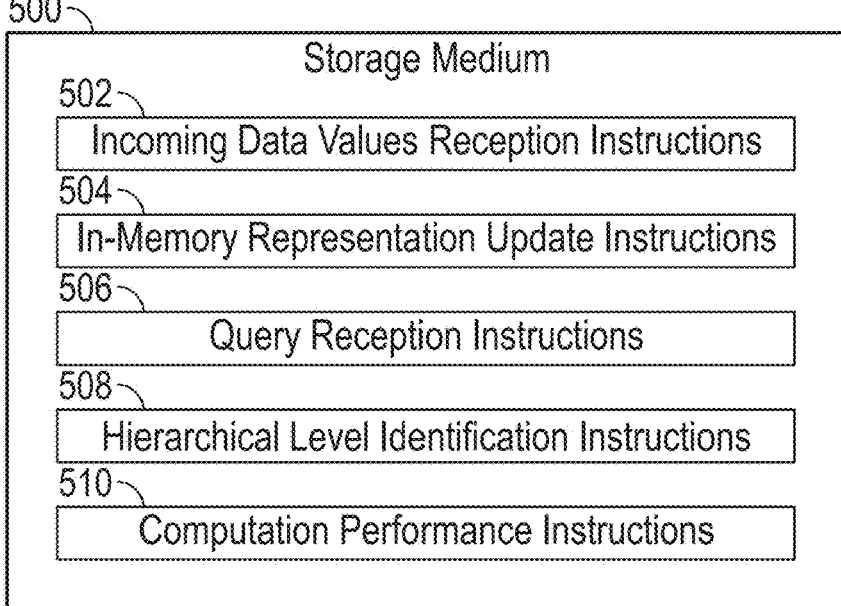
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system may be the analytical system 104 of FIG. 1, for example.

The machine-readable instructions include incoming data values reception instructions 502 to receive incoming data values related to a computing environment. The incoming data values can include telemetry data values or other types of data values.

The machine-readable instructions include in-memory representation update instructions 504 to update, based on the incoming data values, an in-memory representation of the data values including a hierarchical arrangement of bins. A bin of the bins includes a statistical metric based on an aggregate of a subrange of data values, and the bins at different hierarchical levels of the hierarchical arrangement of bins represent different resolutions of data aggregation. "Updating" a statistical metric can refer to computing a new value of the statistical metric.

The machine-readable instructions include query reception instructions 506 to receive a query requesting a computation. The query includes a query filter.

The machine-readable instructions include hierarchical level identification instructions 508 to identify a hierarchical level of the different hierarchical levels of the hierarchical arrangement of bins based on the query filter.

The machine-readable instructions include computation performance instructions 510 to perform the computation using bins at the identified hierarchical level.

A storage medium (e.g., 408 in FIG. 4 or 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a system comprising a hardware processor, the method comprising:

storing, in a memory, an in-memory representation of data values comprising a hierarchical arrangement of bins comprising leaf bins at a lowest level of the hierarchical arrangement, wherein a leaf bin of the leaf bins comprises an aggregated statistical metric based on an aggregate of a subrange of the data values, and bins at different hierarchical levels of the hierarchical arrangement of bins represent different resolutions at which the data values are aggregated;

receiving, at the system, data values related to a computing environment;

assigning a subset of the received data values to a first leaf bin of the leaf bins based on metadata associated with the received data values;

computing a first aggregated statistical metric based on data values of the subset of the received data values;

adding the first aggregated statistical metric to the first leaf bin;

receiving, at the system, a new data value;

update the first aggregated statistical metric in the first leaf bin using a statistic calculation algorithm that updates a current value of the first aggregated statistical metric based on combining the current value of the first aggregated statistical metric with an update value derived from the new data value, wherein a memory footprint of the first leaf bin remains constant after the updating of the first aggregated statistical metric in the first leaf bin;

receiving, at the system, a query requesting a computation, the query comprising a query filter specifying a time range or a domain in the computing environment;

identifying a hierarchical level of the different hierarchical levels of the hierarchical arrangement of bins based on the query filter; and performing the computation using bins at the identified hierarchical level.

2. The method of claim 1, wherein the assigning of the subset of the received data values to the first leaf bin is further based on bin metadata that identifies a domain of the computing environment represented by the first leaf bin.

3. The method of claim 1, wherein the identifying of the hierarchical level of the different hierarchical levels of the hierarchical arrangement of bins based on the query filter comprises determining which of the different hierarchical levels corresponds to a grouping specified by the query filter.

4. The method of claim 1, comprising:

computing a second aggregated statistical metric based on the data values of the subset of the received data values; and adding the second aggregated statistical metric to the first leaf bin, wherein the first leaf bin includes a set of aggregated statistical metrics including the first aggregated statistical metric and the second aggregated statistical metric.

5. The method of claim 1, wherein the different hierarchical levels of the hierarchical arrangement of bins comprise hierarchical levels that correspond to different domains of the computing environment.

6. The method of claim 1, wherein the different hierarchical levels of the hierarchical arrangement of bins comprise hierarchical levels that correspond to different temporal ranges.

7. The method of claim 1, wherein the first leaf bin comprises bin metadata indicating one or more neighbor bins of the first leaf bin.

8. The method of claim 7, comprising:

identifying, by the system, a neighbor bin of the first leaf bin using the bin metadata.

9. The method of claim 8, wherein the neighbor bin is at a hierarchical level that is higher than a hierarchical level of the first leaf bin, the method comprising:

as part of the computation in response to the query, compute an aggregated statistical metric of the neighbor bin, wherein the aggregated statistical metric of the neighbor bin is not computed during ingesting of data values in the system.

10. The method of claim 1, wherein the first aggregated statistical metric of the first leaf bin is aggregated at a first resolution that is greater than a second resolution at which data values are aggregated of a bin at a higher hierarchical level than the first leaf bin in the hierarchical arrangement of bins.

11. The method of claim 1, wherein the system comprises a plurality of computing nodes, the memory is in a first computing node of the plurality of computing nodes, and the in-memory representation of data values is a first in-memory representation of a first subset of data values, and wherein the method further comprises:

producing, by the system in a further memory of a second computing node of the plurality of computing nodes, a second in-memory representation of a second subset of data values comprising a hierarchical arrangement of bins, wherein the computation performed in response to the query further uses bins at a hierarchical level of the second in-memory representation.

12. The method of claim 1, comprising:

maintaining, by the system, a data structure comprising indicators of which bins of the in-memory representation are stale, wherein a given bin is stale if an aggregated statistical metric in a child bin of the given bin has been updated and an aggregated statistical metric in the given bin has not yet been updated.

13. The method of claim 1, comprising:

evicting, by the system, a selected bin from the memory based on a timestamp of the bin; and based on the evicting of the selected bin, evicting, by the system, child bins of the selected bin.

14. A system comprising:

a memory to store an in-memory representation of data values comprising a hierarchical arrangement of bins comprising leaf bins at a lowest level of the hierarchical arrangement, wherein a leaf bin of the leaf bins comprises an aggregated statistical metric based on an aggregate of a subrange of the data values, and bins at different hierarchical levels of the hierarchical arrangement of bins represent different resolutions at which the data values are aggregated;

a processor; and a non-transitory storage medium storing instructions executable on the processor to:

receive data values from a computing environment;

assign a subset of the received data values to a first leaf bin of the leaf bins based on metadata associated with the received data values;

compute a first aggregated statistical metric based on data values of the subset of the received data values;

add the first aggregated statistical metric to the first leaf bin;

receiving a new data value;

responsive to the new data value, update the first aggregated statistical metric in the first leaf bin using a statistic calculation algorithm that updates a current value of the first aggregated statistical metric based on combining the current value of the first aggregated statistical metric with an update value derived from the new data value, wherein a memory footprint of the first leaf bin remains constant after the updating of the first aggregated statistical metric in the first leaf bin;

receive a query requesting a computation, the query comprising a query filter specifying a time range or a domain in the computing environment;

identify a hierarchical level of the different hierarchical levels of the hierarchical arrangement of bins based on the query filter; and perform the computation using bins at the identified hierarchical level.

15. The system of claim 14, wherein responsive to the new data value, the instructions are executable on the processor to:

defer updating an aggregated statistical metric of a parent bin of the first leaf bin.

16. The system of claim 15, wherein the instructions are executable on the processor to:

update the aggregated statistical metric of the parent bin during evaluation of the query.

17. The system of claim 14, wherein the assigning of the subset of the received data values to the first leaf bin is further based on bin metadata that identifies a domain of the computing environment represented by the first leaf bin.

18. A non-transitory machine-readable storage medium comprising instructions that upon execution cause a system to:

store, in a memory, an in-memory representation of data values comprising a hierarchical arrangement of bins comprising leaf bins at a lowest level of the hierarchical arrangement, wherein a leaf bin of the leaf bins comprises an aggregated statistical metric based on an aggregate of a subrange of the data values, and bins at different hierarchical levels of the hierarchical arrangement of bins represent different resolutions at which the data values are aggregated;

receive, at the system, incoming data values related to a computing environment;

assign a subset of the incoming data values to a first leaf bin of the leaf bins based on metadata associated with the incoming data values;

compute a first aggregated statistical metric based on data values of the subset of the incoming data values;

add the first aggregated statistical metric to the first leaf bin;

receive, at the system, a new data value;

update the first aggregated statistical metric in the first leaf bin using a statistic calculation algorithm that updates a current value of the first aggregated statistical metric based on combining the current value of the first aggregated statistical metric with an update value derived from the new data value, wherein a memory footprint of the first leaf bin remains constant after the updating of the first aggregated statistical metric in the first leaf bin;

receive, at the system, a query requesting a computation, the query comprising a query filter specifying a time range or a domain in the computing environment;

identify a hierarchical level of the different hierarchical levels of the hierarchical arrangement of bins based on the query filter; and perform the computation using bins at the identified hierarchical level.

19. The non-transitory machine-readable storage medium of claim 18, wherein the first aggregated statistical metric is updated using Welford's online algorithm.

20. The non-transitory machine-readable storage medium of claim 18, wherein the assigning of the subset of the incoming data values to the first leaf bin is further based on bin metadata that identifies a domain of the computing environment represented by the first leaf bin.

* * * * *